(12) United States Patent
Watanabe et al.

(10) Patent No.: US 8,064,742 B2
(45) Date of Patent: Nov. 22, 2011

(54) LIGHT INPUT/OUTPUT TERMINAL MODULE OF THE OPTICAL COMPONENTS AND BEAM CONVERTING APPARATUS

(75) Inventors: Shingo Watanabe, Tokyo (JP); Mieko Yamagaki, Tokyo (JP); Tatsuya Hatano, Tokyo (JP); Kazuyou Mizuno, Tokyo (JP); Kanji Tanaka, Tokyo (JP); Akira Fujisaki, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 12/240,578

(22) Filed: Sep. 29, 2008

(65) Prior Publication Data

US 2009/0092358 A1    Apr. 9, 2009

Related U.S. Application Data

(63) Continuation of application No. PCT/JP2007/056727, filed on Mar. 28, 2007.

(30) Foreign Application Priority Data

Mar. 29, 2006  (JP) ................................. 2006-091973
Mar. 29, 2006  (JP) ................................. 2006-092510
Mar. 26, 2007  (JP) ................................. 2007-079051
Mar. 26, 2007  (JP) ................................. 2007-079345

(51) Int. Cl.
*G02B 6/36* (2006.01)
*G02B 6/42* (2006.01)

(52) U.S. Cl. ................ 385/31; 385/27; 385/39; 385/51; 385/127; 385/128

(58) Field of Classification Search ............... 385/39, 385/88, 92, 123, 27–31, 50–51, 126–128; 372/6
See application file for complete search history.

(56) References Cited

U.S. PATENT DOCUMENTS

| | | | |
|---|---|---|---|
| 5,291,570 A * | 3/1994 | Filgas et al. ................... 385/78 |
| 2004/0022495 A1 * | 2/2004 | Shapiro et al. ................ 385/48 |
| 2005/0244101 A1 | 11/2005 | Kitabayashi et al. | |
| 2006/0008212 A1 * | 1/2006 | Wada et al. ................... 385/80 |
| 2006/0088243 A1 * | 4/2006 | Tinch et al. ................... 385/33 |
| 2007/0172174 A1 * | 7/2007 | Scerbak et al. ............... 385/76 |

FOREIGN PATENT DOCUMENTS

| | | |
|---|---|---|
| JP | 5-34543 A | 2/1993 |
| JP | 07-120641 A | 5/1995 |
| JP | 07-225325 A | 8/1995 |

(Continued)

*Primary Examiner* — Uyen Chau N Le
*Assistant Examiner* — Michael P Mooney
(74) *Attorney, Agent, or Firm* — Oblon, Spivak, McClelland, Maier & Neustadt, L.L.P.

(57) ABSTRACT

A light input/output terminal module 100 comprises a jacket tube 110 and a flange 120. A glass portion 20 of the optical fiber is inserted in the center portion thereof. To efficiently remove the leaked light in a cladding 22 to the jacket tube 110, the jacket tube 110 is made of silica glass or the same material as that of the cladding 22. The jacket tube 110 is fixed by fusion splicing or adhesion to the cladding so as to integrally unify the jacket tube 110 and the cladding 22. The beam diameter at the fiber end portion is enlarged by an optical component which fusion bonds the tip end of the optical fiber to the coreless fiber so that the optical power density at the light input/output terminal module is reduced.

13 Claims, 7 Drawing Sheets

FOREIGN PATENT DOCUMENTS

| | | |
|---|---|---|
| JP | 7-281054 A | 10/1995 |
| JP | 2001-66483 A | 3/2001 |
| JP | 2003-107294 A | 4/2003 |
| JP | 2003-139996 A | 5/2003 |
| JP | 2004-86127 A | 3/2004 |
| JP | 2005-017702 | 1/2005 |
| JP | 2005-303166 A | 10/2005 |
| WO | WO 03-083546 A1 | 10/2003 |

* cited by examiner (a)

(b)

BACKGROUND ART

BACKGROUND ART

LIGHT INPUT/OUTPUT TERMINAL MODULE OF THE OPTICAL COMPONENTS AND BEAM CONVERTING APPARATUS

FIELD OF THE INVENTION

The present invention relates to a structure of a light input/output terminal module (optical coupling portion) of the optical components, in particular, relates to a structure of a light input/output terminal module applied to high output optical transmission space coupling optical components. In addition, the present invention relates to a beam converting apparatus for collimating the light or focusing the light, in particular, relates to a beam converting apparatus applied to optical components for a high power optical transmission which enables to broaden the beam diameter at the end portion of the optical fiber.

BACKGROUND OF THE INVENTION

Recently, corresponding to the wide spread WDM transmission system enabling a large capacity transmission in an optical communication system, a high output of the used optical power is proceeded. The tendency of the above described optical high output (several W) is enhanced in the future.

In the fabrication field, also high output and high quality laser is required. Accordingly, an input/output resistance to the high output light (several 10 to 100 W) is required in the laser components forming inside thereof or the output component of the laser.

There has been known optical components having diversity of functions in which various optical elements are arranged between the optical fiber and the collimate lens (i.e., collimator). Furthermore, in the fabricating laser, a laser guide is connected through an input side lens portion to the output portion of the laser oscillator. The laser beam output from the laser oscillator is focused in the lens portion, then entered in the optical fiber from the incident portion, and transmitted in the core of the optical fiber. Thus transmitted beam is output from the output end of the optical fiber, then focused by the focus lens in the output side lens portion, and then irradiated.

As the optical component connected in space for a high power beam transmission used in the optical communication and machining such as welding, cutting, there are an optical isolator, a WDM filter module, a PBS (Polarization Beam splitter), a PBC (Polarization Beam Combiner), an optical circulator, a laser guide & laser output head, an optical connector and the like.

As depicted in FIG. 6, a part of the focused incident light by the collimate lens 902 is leaked in the cladding 906 by the coupling loss such as MFD mismatch or lens aberration in the end portion 904 of the optical fiber 903, and transmitted in the optical fiber 903. In the above described high power incident, the power of the leaked light in the cladding cannot be ignored. More specifically, when the leaked light in the cladding 906 is rapidly irradiated to the fiber coating portion 907 by the bending of the optical fiber 903 or the attachment of the foreign substance, the fiber coating portion is melted to cause damage.

Patent document 1 discloses that a tip portion made of sapphire is provided in the tip end portion of the sleeve, a shielding material is provided in the sleeve, or dispersal element is provided in the exposed glass portion of the optical fiber, in order to prevent the damage of the sleeve by the reflecting laser beam when the high power laser beam is output through the laser guide to the article to be fabricated from the laser oscillator, or by the incident laser beam when the optical connector is misaligned to the laser oscillator.

Patent document 2 discloses that a silica pipe is fixed by an inorganic adhesive to the surface of the cladding in the exposed glass portion of the optical fiber within the sleeve in order to prevent the damage of the jacket of the optical fiber even when the reflecting laser beam from the article to be fabricated, or the misaligned laser beam enters the cladding of the optical fiber.

In the above described optical components or fabricating laser, the optical power density becomes maximum value at each end of the optical fiber in which the focused beam by the lens is to be coupled. The loss by the optical absorption due to the dust, and the loss by the optical absorption due to the defect in the optical fiber or the dielectric multi layered filter (e.g., AR coat) are converted to heat to cause a critical defect (e.g., phenomenon such as fiber fuse), thus damaging the optical fiber, optical component or optical device or the like.

There is proposed that the diameter of the beam to be focused at the end of the optical fiber by the connecting portion of the optical connector or the lens is enlarged to lower the optical power density. Patent document 3 proposes that in order to enlarge the MFD (Mode Field Diameter) of the optical fiber, a core enlarged optical fiber is produced by the treatment in which the dopant in the core is heat-diffused (herein after referred to "TEC treatment"), or a GIF (Grated Index Fiber) is connected by fusion splicing to the end portion of the optical fiber (hereinafter referred to "GIF fusion splicing treatment"). Patent document 4 proposes that in order to enlarge the diameter of the beam to be focused on the end portion of the optical fiber, a GIF for expanding the diameter of the mode field is connected by fusion splicing to the tip end of the optical fiber and a coreless fiber having no core is connected by fusion splicing to the tip end of the GIF (herein after referred to "GIF+coreless fiber fusion splicing treatment").

FIG. 12 is a schematic cross sectional view of the optical collimator 590 in which the tip end portion 593 of the core 592 in the optical fiber 591 is enlarged by TEC treatment.

Patent document 1: Japanese Patent Application Publication 2003-107294;

Patent document 2: Japanese Patent Application Publication 2003-139996;

Patent document 3: Japanese Patent Application Publication 2004-86127;

Patent document 4: Japanese Patent Application Publication 2005-17702;

Patent document 5: Japanese Patent Application Publication 2004-86127.

DISCLOSURE OF THE INVENTION

Problem to be Solved

However, there are following problems in the above described conventional optical input/output terminal module. In the module disclosed in Patent document 1, the inorganic adhesive is used to fix the dispersal element to the exposed portion of the glass portion of the optical fiber. In the module disclosed in Patent document 2, the inorganic adhesive is used to fix the silica pipe on the surface of the cladding of the exposed portion of the optical fiber. As the inorganic adhesive, glass-based adhesive or ceramic-based adhesive is used to prevent the damage of the adhesive by the laser beam.

There is a problem in which the light transmitting in the cladding of the optical fiber is not effectively released, since the refractive index of the inorganic adhesive is not identical to the refractive index of the silica glass. Thus, the jacket or the like of the sleeve is likely damaged.

Furthermore, there is a problem at the output end of the optical fiber in which the light reflected from the end face of the optical fiber melts the fiver coating portion of the optical fiber. For example, with reference to FIG. 7, the exited light 911 is reflected from the end face 912 of the optical fiber. The reflected light 913 is leaked in the fiber coating portion 907 of the optical fiber to generate heat, thus causing the problem of melting the fiber coating 907 of the optical fiber.

The TEC treatment disclosed in Patent document 3 has a problem in which it takes time to heat-diffuse the dopant in the core enlarged optical fiber, in addition, the outer diameter of the core enlarged optical fiber becomes small by the treatment of simply holding and heating. Furthermore, there is a problem in which the diameter of the core is hard to be controlled, also hard to be set, since the core is gradually expanded to the tip end thereof like a funnel-shape. The coupling efficiency is therefore likely lowered, when coupled by the optical connector.

In the GIF fusion splicing treatment disclosed in Patent document 4, the center axis of the core in the GIF has the highest refractive index, and the refractive index is gradually lowered to the outer peripheral. In addition, the amount of the dopant is larger than the general single mode optical fiber, since the diameter of the core is large. Thus, the melting point of the optical fiber itself is lowered. There is therefore a problem in which even if the optical power density is lowered at the fiber end portion by enlarging the MFD, the melting point of the optical fiber itself is lowered so that the effect to the melting point is not obtained. There is also the problem in which the control of the length of the GIF is difficult in the grinding process of the tip end face of the GIF, since the MFD varies depending on the length of the GIF. The coupling efficiency is therefore likely lowered, when coupled by the optical connector.

Furthermore, in the GIF+coreless fiber fusion splicing treatment, there is a problem in which the optical constant increases and the loss of fusion splicing increases, since it is necessary to control the length of the GIF and to perform two fusion splicing processes. In the above described TEC treatment, there is the problem in which it takes time to heat-diffuse the dopant in the core enlarged optical fiber, in addition, the outer diameter of the core enlarged optical fiber becomes small by the treatment of simply holding and heating. In addition, there is a problem in which the diameter of the core is hard to be controlled, also hard to be set, since the core is gradually expanded to the tip end thereof like a funnel-shape. The coupling efficiency is therefore likely lowered, when coupled by the optical connector.

Furthermore, in the GIF treatment, there is the problem in which the center axis of the core in the GIF has the highest refractive index, and the refractive index is gradually lowered to the outer peripheral. In addition, the amount of the dopant is larger than the general single mode optical fiber, since the diameter of the core is large. Thus, the melting point of the optical fiber itself is lowered. There is therefore a problem in which even if the optical power density is lowered at the fiber end portion by enlarging the MFD, the melting point of the optical fiber itself is lowered so that the effect to the melting point is not obtained. There is also the problem in which the control of the length of the GIF is difficult in the grinding process of the tip end face of the GIF, since the MFD varies depending on the length of the GIF. The coupling efficiency is therefore likely lowered, when coupled by the optical connector.

Furthermore, in the GIF+coreless fiber fusion splicing treatment, there is the problem in which the optical constant increases and the loss of fusion splicing increases, since it is necessary to control the length of the GIF and to perform two fusion splicing processes.

In addition, there is a problem in which even if the core in the tip end of the optical fiber is enlarged to lower the optical power density, with reference to FIG. 13, a part of the incident light in the optical fiber 591 is leaked in the cladding 594, and thus leaked light of the cladding mode caused the damage of the optical fiber. When the light of the cladding mode is transmitted in the cladding 594 and reached at the fiber coating portion 595, the fiber coating portion 595 is heated to likely cause the damage, since the energy density of the incident light is high.

The present invention is made to overcome the above described problems. One of the objects of the invention is to provide a light input/output terminal module of the optical component enabling to prevent the damage caused by the leaked light of the cladding mode. Other object of the invention is to prevent the damage of the optical fiber, optical component, devices or the like by the optical component connected by fusion splicing the tip end of the optical fiber to the coreless fiber which enlarges the diameter of the beam at the end portion of the optical fiber to lower the optical power density at the optical input/output end. Other object of the invention is to provide a beam converting apparatus enabling to enlarge the diameter of the beam at the end portion of the optical fiber by the use of the optical component in which the tip end of the optical fiber is connected by fusion splicing to the coreless fiber.

Means to Solve the Problem

The first embodiment of the light input/output terminal module of the optical components is the light input/output terminal module of an optical component comprising:
  a waveguide having a core and a cladding to cover an outer peripheral of the core;
  a flange having a shielding portion on a part of an inner face thereof, a first through hole being formed in the shielding portion in which the waveguide is inserted with one end thereof being fixed to an fiber coating portion to cover the waveguide; and
  a jacket tube having optical transparency and including a second through hole formed in a center thereof in which the waveguide is inserted with one end thereof being fixed to other end of the flange.

In the second embodiment of the light input/output terminal module of the optical components, the jacket tube is heat treated to integrally fusion-bonded with the cladding.

In the third embodiment of the light input/output terminal module of the optical components, the jacket tube is fixed by adhesive to the cladding so as to have an identical refractive index each other.

In the fourth embodiment of the light input/output terminal module of the optical components, the waveguide and the jacket are adhered by a UV hardening adhesive having the same refractive index as that of the cladding of the waveguide.

In the fifth embodiment of the light input/output terminal module of the optical components, the waveguide and the jacket tube are adhered by a substance having siloxane bond irradiated with any of an ultraviolet radiation, excimer laser, and excimer lamp.

In the sixth embodiment of the light input/output terminal module of the optical components, the jacket tube has about the same as or larger refractive index than that of the cladding.

In the seventh embodiment of the light input/output terminal module of the optical components, the refractive index of the jacket tube is determined to be at least a prescribed value of a rate of removing a leaked light from the cladding to the jacket tube.

In the eighth embodiment of the light input/output terminal module of the optical components, the jacket tube is made of a silica glass.

In the ninth embodiment of the light input/output terminal module of the optical components, the jacket tube is made of a same material as the cladding.

In the tenth embodiment of the light input/output terminal module of the optical components, a connecting portion of the flange to the jacket tube, and a connecting portion of the flange to the fiber coating portion are fixed by a heat resistant inorganic adhesive or an epoxy adhesive.

In the eleventh embodiment of the light input/output terminal module of the optical components, a diameter and a length of the jacket tube is determined to be at least a prescribed value of a rate of removing a leaked light from the cladding to the jacket tube.

In the twelfth embodiment of the light input/output terminal module of the optical components, the flange is made of a stainless-based metal material.

In the thirteenth embodiment of the light input/output terminal module of the optical components, a coreless fiber having the same refractive index as that of the core is further fusion-bonded to an end face of the waveguide.

In the fourteenth embodiment of the light input/output terminal module of the optical components, a length along an optical axis and a diameter of the coreless fiber is determined in such manner that a optical power density of a light incident in the coreless fiber from the waveguide is reduced by a prescribed rate and exited therefrom.

In the fifteenth embodiment of the light input/output terminal module of the optical components, the coreless fiber is integrally fusion-bonded with a side face (end face) of the second through hole in the jacket tube by heat treating the jacket tube.

In the sixteenth embodiment of the light input/output terminal module of the optical components, an opposite end face of the coreless fiber to an end face connected to the waveguide is obliquely polished or cut off at a prescribed angle to the optical axis of the waveguide and then an antireflective coating is applied thereon.

The first embodiment of a beam converting apparatus is a beam converting apparatus for collimating and focusing a light which comprises: a fiber patch cord comprising an component in which a tip end of an optical fiber and a coreless fiber having no core to broaden a beam diameter are connected by fusion splicing; and a lens,
wherein, a diameter of the coreless fiber is changed in correspond to a optical power density of an incident light, not depending on an outer diameter of an optical fiber. According to the above feature, the diameter of the beam at the tip end face of the fiber patch cord is enlarged in comparison with the diameter of the beam at the interface between the coreless fiber and the optical fiber. Accordingly, it enables to lower the optical power density at the tip end face of the fiber patch cord. For example, when the diameter of the beam is enlarged 2.5 times, the irradiated area is enlarged about 6 times so that the optical power density is lowered to be about one sixth.

The second embodiment of a beam converting apparatus is a beam converting apparatus for collimating and focusing a light which comprises: a fiber patch cord comprising an component in which tip ends of a plurality of optical fibers and a coreless fiber having no core to broaden a beam diameter are connected in a same interface by fusion splicing; and a lens. According to the above feature, the diameter of the beam at the tip end face of the fiber patch cord is enlarged in comparison with the diameter of the beam at the interface between the coreless fiber and the optical fiber. Accordingly, it enables to lower the optical power density at the tip end face of the fiber patch cord. Furthermore, the number of components forming the beam converting apparatus can be cut down so that it can be possible to reduce the cost of fabricating the beam converting apparatus. In addition, the respective tip ends of the plurality of optical fibers are simultaneously connected by fusion splicing to one coreless fiber, thus enabling to reduce the number of processes of the fusion splicing. Therefore, the fusion splicing loss can be lowered, and it is possible to reduce the cost of fabricating the beam converting apparatus.

In the third embodiment of a beam converting apparatus, an outer diameter of the coreless fiber is large enough to connect the tip end of the plurality of optical fibers to the coreless fiber in a same interface by fusion splicing, based on an outer diameter of the plurality of optical fibers.

The fourth embodiment of a beam converting apparatus is a beam converting apparatus for collimating and focusing a light which comprises: a fiber patch cord comprising an component in which a coreless fiber portion in one or plurality of single optical fiber patch cords is adhered or fixed by fusion splicing to an capillary, the single optical fiber patch cord comprising an component in which a tip end of an optical fiber and a coreless fiber having no core to broaden a beam diameter are connected by fusion splicing; and a lens. According to the above feature, the diameter of the beam at the tip end face of the fiber patch cord is enlarged in comparison with the diameter of the beam at the interface between the coreless fiber and the optical fiber. Accordingly, it enables to lower the optical power density at the tip end face of the fiber patch cord. In addition, it is possible to reduce the number of the components forming the beam converting apparatus, and also it is possible to reduce the cost of fabricating the beam converting apparatus.

In the fifth embodiment of a beam converting apparatus, the capillary includes a hole or plurality of holes to receive the respective coreless portions in the one or plurality of single optical fiber patch cords, the hole having the same or about the same diameter as the outer diameter of the coreless fiber.

In the sixth embodiment of a beam converting apparatus, the capillary comprises a silica glass capillary or a glass capillary having a same refractive index as that of the coreless fiber.

In the seventh embodiment of a beam converting apparatus, the refractive index of the coreless fiber is identical to the refractive index of the core of the optical fiber. According to the above feature, the optical loss in the interface between the optical fiber and the coreless fiber can be reduced.

In the eighth embodiment of a beam converting apparatus, the coreless fiber comprises a glass rod or a silica rod. According to the above feature, the optical loss in the interface between the optical fiber and the coreless fiber can be reduced.

In the ninth embodiment of a beam converting apparatus, the outer diameter of the coreless fiber is formed in such manner that the optical power density in the tip end face of the coreless fiber connected by fusion splicing to the optical fiber is within a prescribed range, based on the beam diameter of the optical fiber, and, the optical power density defined by a kind of the optical fiber and the wavelength of the light to be used. According to the above feature, even if the fiber patch cord has a large optical broadening angle in the coreless fiber, it is possible to reduce the optical power density at the tip end face of the fiber patch cord.

In the tenth embodiment of a beam converting apparatus, the coreless fiber of the optical fiber patch cord is polished or cut off to be a prescribed length in the light transmission direction in such manner that the optical power density in the tip end face of the coreless fiber connected by fusion splicing to the optical fiber is within a prescribed range, based on the beam diameter of the optical fiber, and, the optical power density defined by a kind of the optical fiber and the wavelength of the light to be used. According to the above feature, even if the incident light in the optical fiber has a large optical power density, it is possible to reduce the optical power density at the tip end face of the fiber patch cord.

In the eleventh embodiment of a beam converting apparatus, the tip end face of the coreless fiber of the optical fiber patch cord is obliquely polished or cut off at a prescribed angle. According to the above feature, it is possible to reduce the reflection at the tip end face of the fiber patch cord.

In the twelfth embodiment of a beam converting apparatus, an antireflective coating treatment is applied on the tip end face of the coreless fiber of the optical fiber patch cord. According to the above feature, it is possible to reduce the reflection at the tip end face of the fiber patch cord.

The thirteenth embodiment of a beam converting apparatus is a beam converting apparatus for collimating and focusing a light which comprises:

an optical fiber patch cord comprising an optical fiber and a coreless fiber connected by fusion splicing to an end face of the optical fiber;
a capillary firmly adhered to an outer peripheral face of the optical fiber patch cord;
a ferrule integrally covering a fiber coating portion of the optical and the capillary; and
a lens focusing an incident light in the coreless fiber, or collimating an exited light from the coreless fiber.

In the fourteenth embodiment of a beam converting apparatus, the optical fiber patch cord and the capillary are heat treated to be firmly adhered.

In the fifteenth embodiment of a beam converting apparatus, refractive index of the capillary is about identical to the refractive index of the cladding of the optical fiber.

In the sixteenth embodiment of a beam converting apparatus, the ferrule includes a shielding portion between the optical fiber patch cord and the fiber coating portion of the optical fiber.

Effect of the Invention

According to the present invention, since the jacket tube is integrally fusion-bonded to the cladding, it is possible to provide the light input/output terminal module of the optical component enabling to improve the rate of removing the leaked light in the cladding to prevent the damage. Since the light input/output terminal module of the optical component of the invention includes the jacket tube and the flange, it is possible to effectively transfer the leaked light from the cladding to the jacket tube, and then to dissipate outside through the flange.

Furthermore, since the coreless fiber having the identical refractive index to that of the core of the optical fiber is connected by fusion splicing to the end face of the optical fiber, the diameter of the beam is enlarged at the end face of the optical fiber to lower the optical power density so that the optical fiber, optical component, optical devices or the like can be prevented from being damaged. In addition, according to the present invention, even if the fiber patch cord has a large optical broadening angle in the coreless fiber, and even if the incident light in the optical fiber has a large optical power density, it is possible to reduce the optical power density at the tip end face of the fiber patch cord. According to the above feature, it is possible to overcome the conventional problem in which the loss is caused by the optical absorption due to the dust at the end of the optical fiber where the focused light by the lend is coupled, the loss by the optical absorption due to the defect in the optical fiber or the dielectric multi layered filter are converted to heat to cause a critical defect (e.g., phenomenon such as fiber fuse), thus damaging the optical fiber, optical component or optical device or the like.

Furthermore, according to the present invention, it is possible to reduce the number of the components forming the beam converting apparatus, and also it is possible to reduce the cost of fabricating the beam converting apparatus. In addition, the respective tip ends of the plurality of optical fibers are simultaneously connected by fusion splicing to one coreless fiber, thus enabling to reduce the number of processes of the fusion splicing. Therefore, the fusion splicing loss can be lowered, and it is possible to reduce the cost of fabricating the beam converting apparatus.

BRIEF DESCRIPTION OF THE DRAWINGS

FIG. 1(a) is a side cross-sectional view thereof, and FIG. 1(b) is a front view thereof;

DESCRIPTION OF REFERENCE NUMERALS

Figure 1:
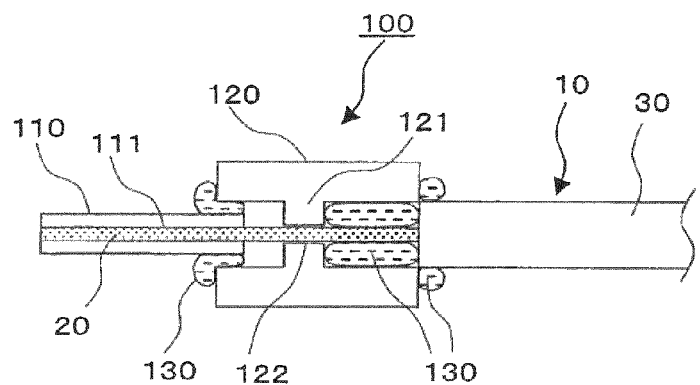
FIG. 1 is a schematic view showing the configuration of the light input/output terminal module in one of the embodiment of the invention.
Figure 1:
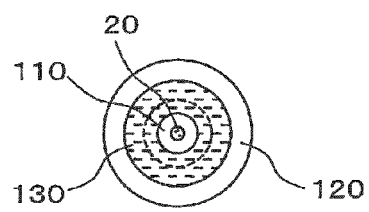

10, 903 optical fiber
20 glass portion of the optical fiber 21, 905 core
22, 906 cladding
30, 907 fiber coating portion
40, 902 collimate lens
100, 200, 300 light input/output terminal module
110, 210, 310 jacket tube
111 second through hole
120, 220 flange
121, 221 shielding portion
122 first through hole
130 adhesive
140, 901 incident light
141, 241 leaked light
240, 911 exited light
251 end face
341 reflecting light
350 coreless fiber
351 output side end face
904 end face
912 end face of the optical fiber
913 reflecting light
510, 540, 590 optical collimator
511 collimator case
512 ferrule
513, 531, 537 single optical fiber patch cord
514 lens
515 lens holder
516, 524, 526, 533, 535, 541, 591 optical fiber
517, 525, 534, 536, 542 coreless fiber
518, 545 capillary
520 two fiber ferrule
521, 530 two optical fiber patch cord
522 adhesive
523 housing
532 capillary
543, 594 cladding
544, 595 fiber coating portion
546 ferrule
547 leaked light
592 core
593 tip end portion of the core

BEST MODE FOR CARRYING OUT THE
INVENTION

A configuration of a light input/output terminal module of the optical component in the preferable embodiment of the invention is described in detail with reference to the drawings. In order to simplify the illustration and description, the same reference numeral is given to each component having the same function.

FIG. 1 is a schematic view showing the configuration of the light input/output terminal module in one of the embodiment of the invention. FIG. 1(a) is a side cross-sectional view of the light input/output terminal module 100 in the embodiment, and FIG. 1(b) is a front view of the input/output terminal module 100 sighted from the left side in the drawing. In this embodiment, an optical fiber is selected as an example of the waveguide in the optical component, and the input/output terminal module of the optical fiber is described.

In FIG. 1, the optical fiber comprises a glass portion 20 of the fiber as the waveguide and a coating portion 30 of the fiber, and includes a light input/output terminal module 100 on an end portion thereof. The input/output terminal module 100 comprises a jacket tube 110 and a flange 120, through the respective center portion of which the glass portion 20 of the fiber is inserted.

The jacket tube 110 having optical transparency is formed into a cylindrical rod shape. A through hole (second through hole) 111 is formed through the center portion of thereof, such that the glass portion of the fiber is inserted therethrough. The flange 120 is made of cylindrical metal. A shielding portion 121 is installed in the middle portion thereof. The first through hole 122 is formed through the center portion of the shielding portion 121, such that the glass portion 20 of the fiber is inserted therethrough.

The inner diameter of the flange 120 is formed to be the same as the outer diameter of the Jacket tube 110 or a little larger, so that the jacket tube 110 can be inserted in the inner diameter of the flange 120. One end of the jacket tube 110 is inserted into the flange for a prescribed length from the end of the flange, and fixed therein by adhesive joining. The exposed glass portion 20 of the fiber with the coating portion removed is inserted from the other end of the flange 120. The other end of the flange 120 is fixed to the coating portion 30 by adhesive joining. Thus, the input/output terminal module 100 is mounted on the optical fiber.

Figure 2:
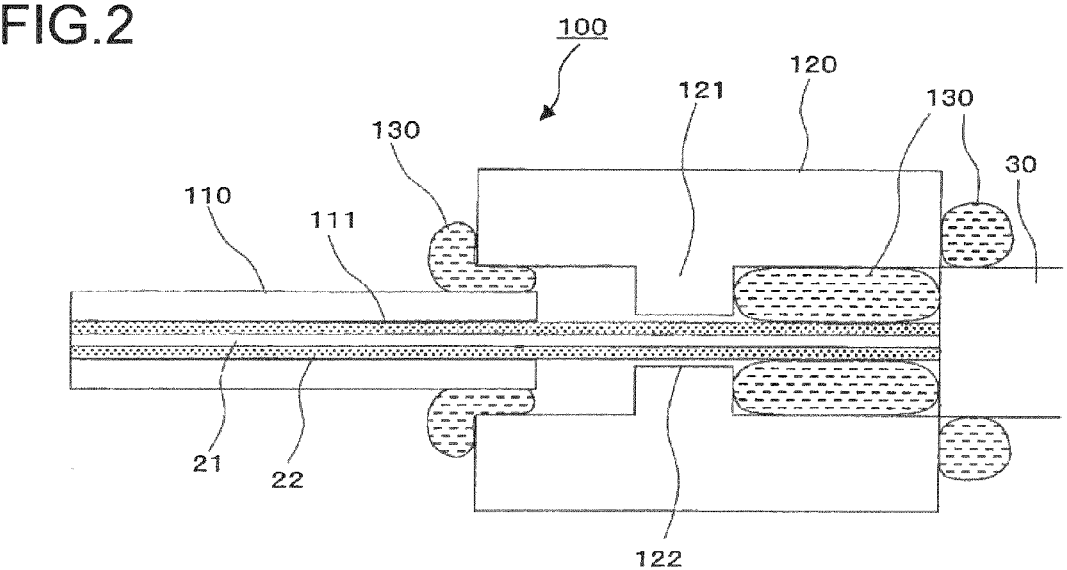
FIG. 2 is an enlarged side cross-sectional view of the light input/output terminal module depicted in FIG. 1(a)

The structure of the input/output terminal module 100 is described in more detail with reference to FIG. 2. FIG. 2 is an enlarged side cross-sectional view of the light input/output terminal module depicted in FIG. 1(a).

In the light input/output terminal module 100 of the embodiment, the jacket tube 110 is made of silica glass or the same material as the cladding 22 so that a leaked light in the cladding 22 of the optical fiber 10 is effectively removed into the jacket tube 110. Furthermore, the jacket tube 110 is fusion-bonded with the cladding 22 by the heat of arc discharge or $CO_2$ laser to unify the jacket tube 110 and the cladding 22.

As described above, when the jacket tube 110 is made of the same material as the cladding 22, the leaked light can be emitted from the cladding 22 to the jacket tube 110 without being affected by the refractive index, since the refractive index of the jacket tube 110 becomes identical to the refractive index of the cladding 22. Furthermore, when the jacket tube 110 is made of silica glass, the leaked light can be effectively emitted from the cladding 22 to the jacket tube 110, since the refractive index of the jacket tube 110 becomes larger than the refractive index of the cladding 22.

It is possible in the embodiment to reduce the rate in which the leaked light would be reflected at the boundary between the jacket tube 110 and the cladding 22 and return into the cladding 22, since the jacket tube 110 and the cladding 22 are unified by fusion-splicing.

According to the input/output terminal module 100 of the embodiment of the invention, as described above, the refractive index of the jacket tube 110 is made equal to or larger than the refractive index of the cladding 22, and the jacket tube 110 and the cladding 22 are unified by the heat treatment or adhesive joining, thus the leaked light in the cladding 22 is effectively transmitted to the jacket tube 110.

How to connect the jacket tube 110 to the flange 120, and how to connect the flange 120 to the coating portion 30 of the optical fiber are described. One end of the jacket tube 110 is inserted for a prescribed length into the flange 120, and the gap between the outer surface of the jacket tube 110 and the inner wall of the flange is jointed by a prescribed adhesive 130. Heat resistant inorganic adhesive or epoxy adhesive may be used as the adhesive 130.

Since the gap between the outer surface of the jacket tube 110 and the inner wall of the flange is jointed by the heat resistant inorganic adhesive or epoxy adhesive, the adhesive can be prevented from absorbing the leaked light emitted from the jacket tube 110 to be damaged by the burning. The leaked light emitted from the jacket tube 110 is changed to a heat in the flange 120, and dissipated outside. The flange may be made of stainless based metal material having a high corrosion resistance.

The length of the inserted jacket tube 110 into the flange 120 is determined considering that the generated heat by the leaked light emitted from the jacket tube 110 to the shielding portion 121 of the flange does not affect the jacket tube 110. More specifically, the gap between the one end of the jacket tube 110 and the shielding portion 121 is determined so that the jacket tube 110 is not strongly affected by the heat generated in the shielding portion 121.

On the other hand, the adhesive such as the heat resistant inorganic adhesive or epoxy adhesive is filled in not only the connecting portion of the flange 120 to the fiber coating portion 30, but also the gap between the shielding portion 121 and the fiber coating portion 30, and jointed by the adhesive. Thus, the leaked light passing from the jacket tube 110 through the first through hole 122 is effectively dissipated outside without allowing to reach the fiber coating portion 30. As a result, the temperature in the inner portion of the flange can be prevented from being raised to a high temperature.

Figure 3:
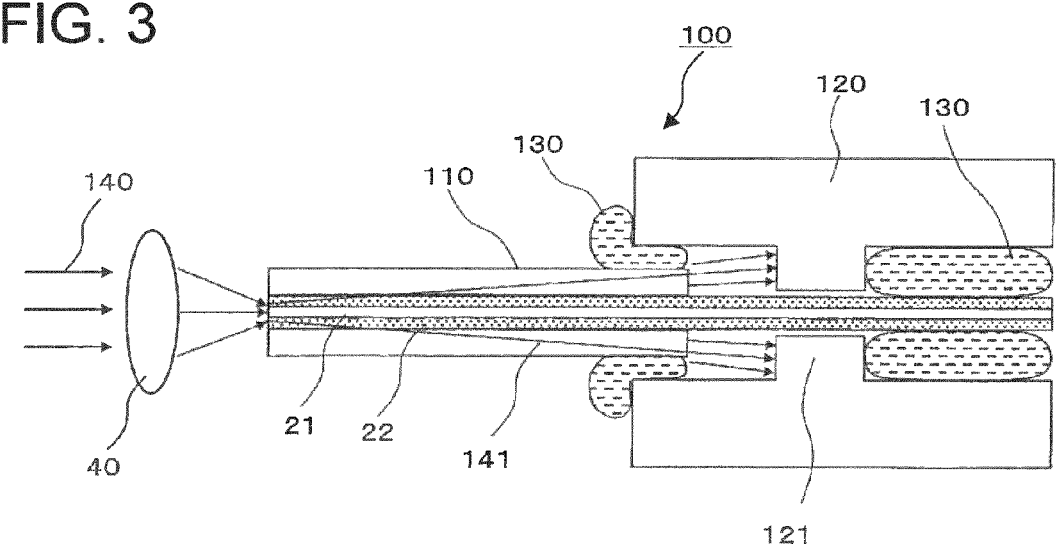
FIG. 3 is a schematic view describing the process of the leaked light incident in the cladding.

Then, the mechanism, how the leaked light incident in the cladding 22 is treated in the light input/output terminal module 100 of the embodiment of the invention, is described with reference to FIG. 3. The incident light 140 from outside is focused by the collimating lens 40 and entered into the core 21 of the optical fiber 10. In this instance, a part of the light is not entered in the core but entered in the cladding 22 because of the MFD (mode field diameter) mismatch or the lens aberration. The light entered in the cladding 22 is referred to as the leaked light hereinafter.

In the embodiment of the invention, the jacket tube 110 and the cladding 22 are unified so that the leaked light is effectively emitted from the cladding 22 to the jacket tube 110. The leaked light 141 emitted into the jacket tube 110 is irradiated from the end of the jacket tube 110 to the shielding portion 121 of the flange 120. The length and the diameter of the jacket tube 110 is determined, considering that the leaked light 141 is effectively thrown off from the cladding 22 to the shielding portion 121 through the jacket tube 110.

Thus, the shielding portion 121 is heated to a higher temperature. However, since the flange 120 is made of stainless based metal material having a high corrosion resistance, the flange functions per se as a heat-dissipating body so that the heat generated by the leaked light 141 is transferred from the shielding portion 121 to the outer peripheral portion of the flange 120, and dissipated outside. Thus, the temperature of the light input/output terminal module 100 can be prevented from being raised by the leaked light 141.

As described above, although the leaked light 141 emitted from one end of the jacket tube 110 is shielded by the shielding portion 121 of the flange 120, there remains a possibility that part of the leaked light 141 passes though the through hole 122 formed in the shielding portion 121 and reaches at the opposite side of the shielding portion 121. In the light input/output terminal module 100 of one embodiment of the invention, the adhesive is filled into the portion between the opposite side of the shielding portion 121 and the fiber coating portion 30 so that the leaked light reaching at the opposite side of the shielding portion 121 does not reach at the fiber coating portion 30. Thus, the leaked light is shielded so as not to damage the fiber coating portion 30.

According to the light input/output terminal module of the embodiment of the invention, the diameter and the length of the jacket tube 110 is appropriately determined so that the rate of removing the leaked light 141 in the cladding 22 can be maintained at least the prescribed value. More specifically, the diameter and the length of the jacket tube 110 is determined in such manner that the leaked light 141 from the cladding 22 is not reflected from the outer wall of the jacket tube 110, but fully scattered in the one end of the jacket tube 110, thus enabling to improve the removing rate of the leaked light 141 in the cladding 22.

For example, a single mode optical fiber (SMF) having a glass portion with the diameter of $\phi 0.125$ mm is used for the optical fiber 10, and a laser light having a wavelength of about 1000 to 1100 nm is used as an incident light 140. It is appropriate to use the jacket tube 110 which has the diameter of at least $\phi 1.4$ mm, and the length of at least 6 mm. It is then possible to maintain the removing rate of at least 90% in the cladding.

The diameter of the flange 120 is preferably at least 1.8 mm. In particular, when the shape of the flange 120 is formed to be the same as that of the conventional ferrule, the conventional ferrule can be simply replaced by the light input/output terminal module. Furthermore, an end face of the incident side of the jacket tube 110 is obliquely polished, and an antireflective coating may be applied thereon. The angle of the end face obliquely polished is preferably at least 8 degree, when the conventional SMF is used. With the angle of at least 8 degree, more excellent characteristics can be obtained when the SMF having a large core diameter or a multi mode optical fiber (MMF) is used. However, a smaller angle may be applied when the SMF having a large core diameter or a multi mode optical fiber (MMF) is used. In this case, the leaked light 141 can be prevented from being reflected in the end face of the jacket tube 110. As described above, the jacket tube 110 and the cladding 22 are unified by fusion-splicing so that the leaked light in the cladding 22 can be effectively transmitted to the jacket tube 110, thus it becomes possible to improve the rate of removing the leaked light in the cladding 22. The leaked light transmitted to the jacket tube 110 is further emitted to the flange 120 so as to be dissipated therein, thus enabling to prevent the damage of the optical fiber.

Figure 4:
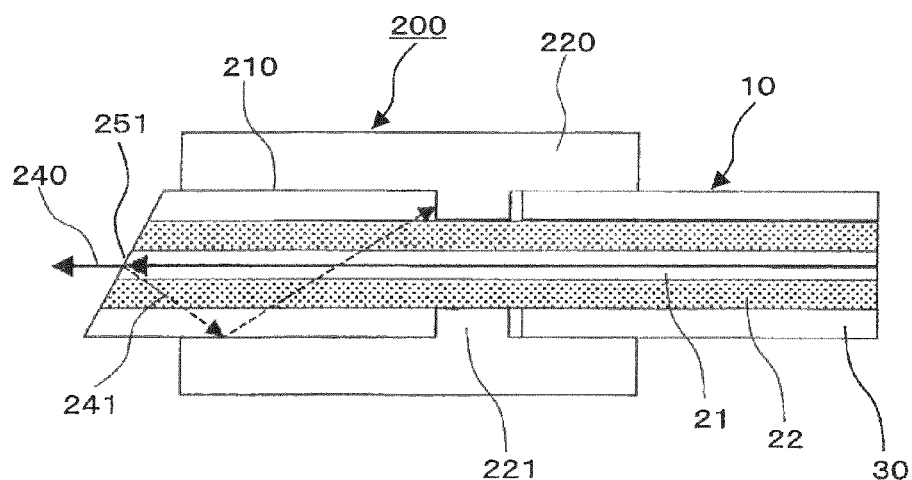
FIG. 4 is a schematic side sectional view showing the light input/output terminal module of the optical component according to other embodiment of the invention.

Another embodiment of the light input/output terminal module of the optical component of the invention is described with reference to FIG. 4. FIG. 4 is a schematic view showing the light input/output terminal module 200 applied in case where the light is exited from the end portion of the optical fiber 10. In the foregoing, the case is described where the incident light 140 is entered into the optical fiber 10, hereunder the case is described where the light is exited from the end portion of the optical fiber.

In case where the light is exited from the end portion of the optical fiber, a part of the out going light transmitted in the core 21 is reflected at the end face 251 and leaked into the cladding 22. The leaked light is transmitted in the cladding 22, and further into the jacket tube 210. The leaked light transmitted in the jacket tube 210 is shielded by the shielding portion 221 of the flange 220 so as not to reach at the fiber coating portion 30. The leaked light is eventually changed to a heat by the flange 220 or the shielding portion 221, and dissipated outside from the outer surface of the flange 220.

As depicted in FIG. 4, the end face of the output side of the jacket tube 210 is obliquely polished together with the end face 251 of the glass portion 20 of the optical fiber, and an antireflective coating may be applied thereon. The angle of the end face 251 obliquely polished is preferably at least 8 degree, for example, when the conventional SMF is used. With the angle of at least 8 degree, more excellent characteristics can be obtained when the SMF having a large core diameter or a multi mode optical fiber (MMF) is used.

Incidentally, in the light input/output terminal module 200 of the embodiment, the gap is not formed between the shielding portion 221 of the flange 220 and the opposite side end face to the output side of the jacket tube 210, as well as between the shielding portion 221 and the fiber coating portion 30. This is based on the fact that, as described above, a part of the focused light by the collimating lens 40 is leaked in the cladding in the light input/output terminal module 100 on which the light is incident, while on the other hand, the strength of the leaked light in the input/output terminal module 200 from which the light is exited is small in comparison with the strength of the leaked light in the input/output terminal module 100 on which the light is incident, since the input/output terminal module 200 treats the leaked light which is reflected at the end face 251 and leaked in the cladding 22. Consequently, even if the end face of the jacket tube 210 and the end portion of the fiber coating portion 30 is placed close to each other on the opposite side of the shielding portion 221 so as to sandwich the same, there is no possibility that the fiber coating portion is melt.

As described above, according to the light input/output terminal module 200 of the embodiment of the invention, even if the part of the out going light 240 is reflected on the fiber end face 251 to leak into the cladding 22, it becomes possible to prevent the fiber coating portion 30 from being melt by the heat which the reflected light generates.

Figure 5:
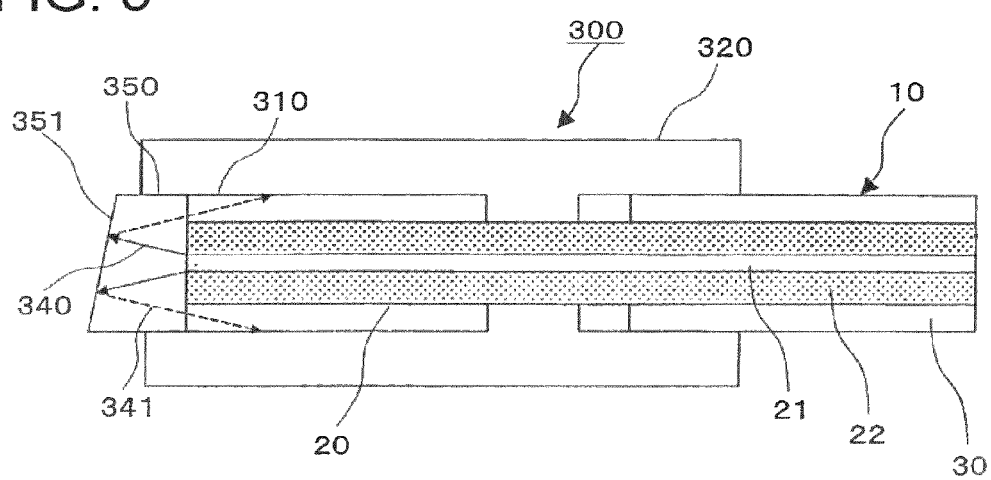
FIG. 5 is a schematic side cross sectional view showing the light input/output terminal module of the optical component according to other embodiment of the invention.
Figure 6:
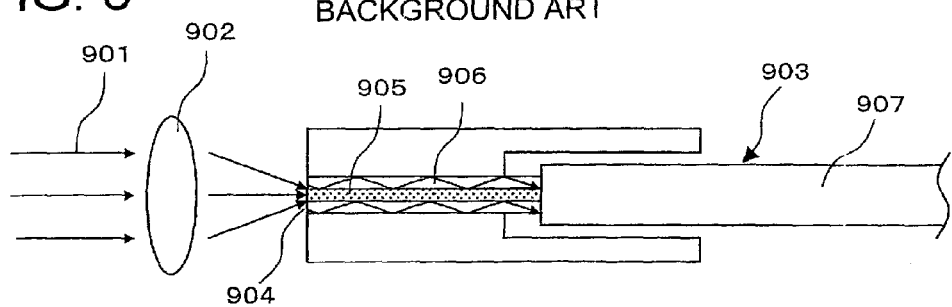
FIG. 6 is a schematic view describing the leaked light of the cladding mode.
Figure 7:
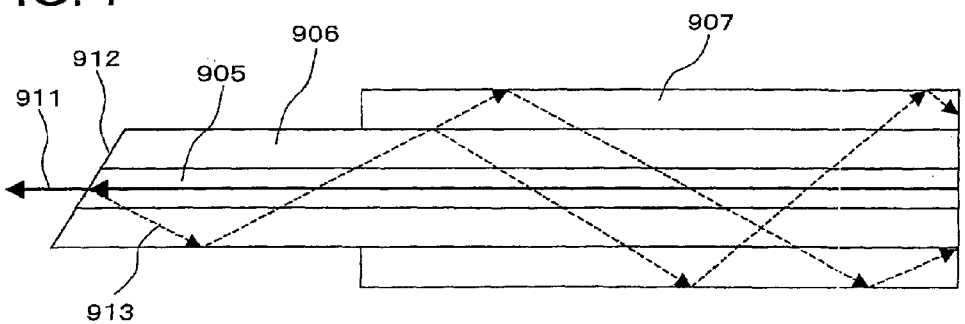
FIG. 7 is a schematic view describing light transmission reflecting at the end face of the optical fiber.

Other embodiment of the light input/output terminal module of the optical component of the invention is described with reference to FIG. 5. The light input/output terminal module of the embodiment is also applied to the case where the light is exited from the end portion of the optical fiber 10. FIG. 5 is a schematic view showing the light input/output terminal module 300.

In the light input/output terminal module 300 of the embodiment of the invention, the glass portion 20 of the fiber and the jacket tube 310 are unified, and a coreless fiber 350 is connected to the tip of the unified glass portion 20 and the jacket tube 310. The coreless fiber is formed to have the same refractive index as that of the core 21, and at least a larger diameter than the diameter of the core 21.

The coreless fiber 350 is fusion-bonded to the tip of the glass portion 20 of the optical fiber, furthermore, in this embodiment, the coreless fiber 350 is also fusion-bonded to the tip of the jacket tube 310. The fusion splicing of the coreless fiber 350 both to the glass portion 20 of the optical fiber and the jacket tube 310 is carried out by the heat of arc discharge or CO2 laser, in the same manner as the fusion splicing of the glass portion 20 to the jacket tube 310.

Since the optical power density is high at the end portion of the glass portion of the optical fiber, the optical absorption in the end portion due to the dust or defect of the optical fiber generates heat to damage the optical fiber. In order to solve the problem, the coreless fiber 350 is connected to the tip of the glass portion 20 of the optical fiber so that the light exited from the glass portion 20 of the optical fiber is scattered in the coreless fiber 350, thus the light with low optical power density is exited from the end portion of the coreless fiber 350.

Furthermore, in this embodiment, the output side end face 351 is obliquely polished or cut off with a prescribed angle to the optical axis of the glass portion 20 of the optical fiber so as to reduce the reflection at the output side end face 351 of the coreless fiber 350. The prescribed angle can be set as 8 degree, for example.

However, even if the output side end face 351 of the coreless fiber is obliquely formed as described above, it is not possible to completely suppress the reflective light on the output side end face 351. As depicted in FIG. 5, a part of the exited light reflects on the output side end face 351 so as to produce the reflective light 341. In the light input/output terminal module 300 of this embodiment, the reflective light 341 entered into the cladding 22 is guided to the outside through the jacket tube 310.

The length in the optical axis direction and the diameter of the coreless fiber 350 is determined in such manner that the optical power density of the light incident in the glass portion of the optical fiber becomes small for a specific ratio on the output side end face 351. Furthermore, as depicted in FIG. 5, since the coreless fiber 350 and the jacket tube 310 are directly fusion-bonded in this embodiment, it is possible to determine the length and the diameter of the coreless fiber such that the reflective light 341 is directly entered into the jacket tube 310 at the output side end face 351.

As described above, in case that the reflective light 341 reflected at the output side end face 351 of the coreless fiber 350 connected to the tip of the glass portion of the optical fiber is incident in the cladding 22, it becomes possible to prevent the reflective light 341 from being reached at the fiber coating portion 30, when the light input/output terminal module of this embodiment of the invention is used.

In the embodiment as described above, the jacket tube 110 is formed by the silica glass or the same material as that of the cladding 22, and the jacket tube 110 is fusion-bonded to the cladding 22 by means of the heating using the arc discharge or CO2 laser to unify the jacket tube 110 and the cladding. Alternatively, the jacket may be fixed to the cladding by an UV adhesive having the same refractive index as that of the silica glass or the cladding.

As for the optical fiber 10, in addition to the single optical fiber in the embodiment described above, the multiple optical fibers having at least two optical fibers may be used. The shape of the jacket tube 110 is not limited to the circular cylindrical shape, but various pillar shapes having such as a polygonal, oval, and ellipse cross section may be applicable.

In that case, the second through hole 111 of the jacket tube 110 is configured to have an appropriate cross section in which a plurality of optical fibers or the multiple numbers of the optical fibers are placed. More specifically, the cross section of the second through hole is selected to be fit to the shape circumscribed to the cross section of the densely placed (bundled) plurality of optical fibers, i.e., the shape such as circular, polygonal, oval, and ellipse. Alternatively, a plurality of through holes can be installed in the jacket tube 110 so that each optical fiber in the multiple optical fibers is placed in the respective through hole.

When such multiple numbers of the optical fibers are used, the shape of the first through hole 122 in the shielding portion 121 is selected to be the same or close as the second through hole 111 in the jacket tube 110 which approximately fits to the cross section of the bundled plurality of the optical fibers so that the multiple numbers of the optical fibers are placed therein while the leaked light can be shielded.

The above described embodiments of the invention show examples of the light input/output terminal module of the optical component of the invention, and are not limited thereto. The detailed construction and the detailed operation of the light input/output terminal module of the optical components in the above described embodiments can be appropriately modified within the scope of the idea of the invention.

Then, embodiments of a beam converting apparatus of the invention are described with reference to the drawings.

Figure 8:
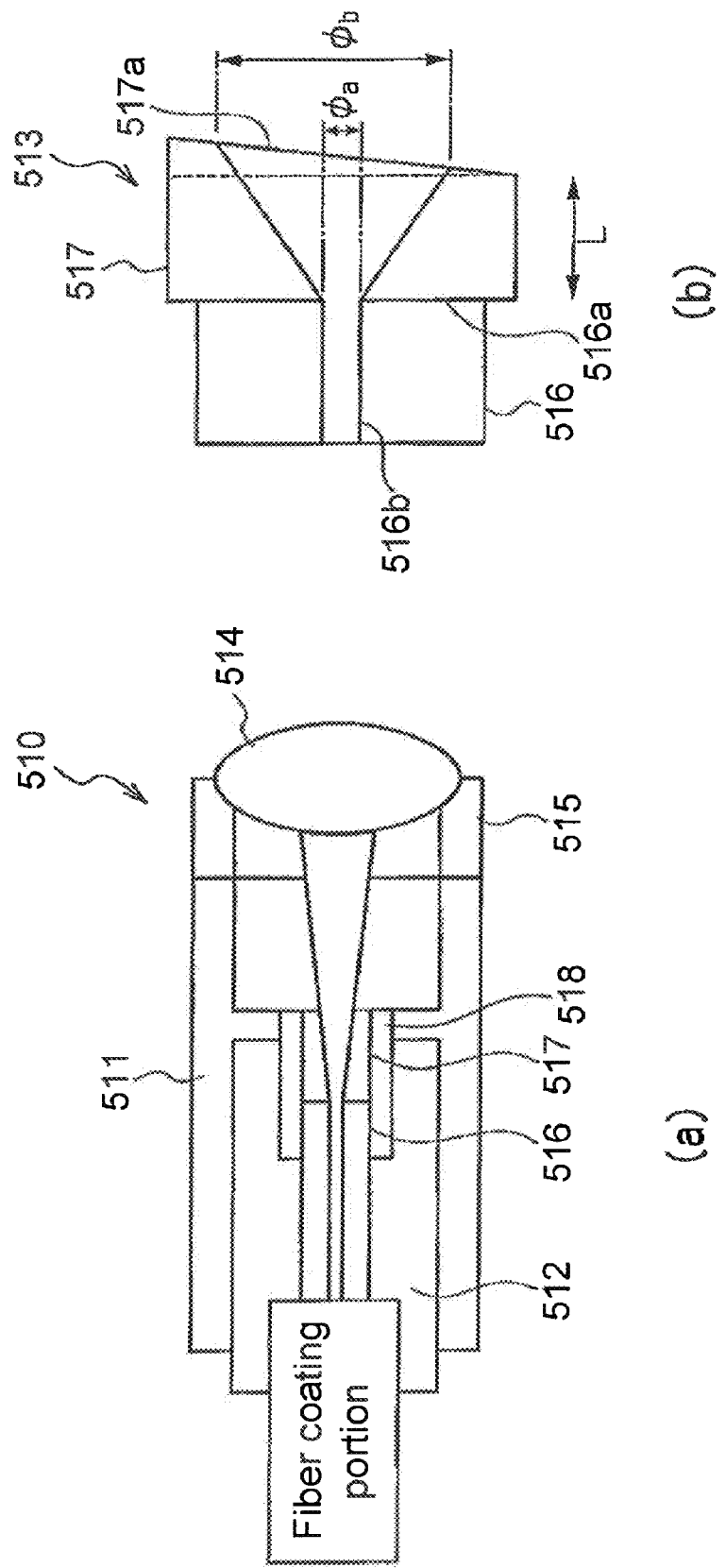
FIG. 8 is a schematic view showing an example of the optical collimator of the invention, FIG. 8-A is a cross sectional view of the optical collimator, and FIG. 8-B is a cross sectional view of the single optical fiber patch cord.

FIG. 8 is a schematic view showing an example of the optical collimator of the invention, wherein FIG. 8-A is a cross sectional view of the optical collimator, and FIG. 8-B is a cross sectional view of the single optical fiber patch cord (connector).

As depicted in FIG. 8, the optical collimator 510 which changes a broadened optical signal exited from the optical fiber to the collimated light beam comprises a collimator case 511, a ferrule 512, a single optical fiber patch cord 513, a lens 514, and a lens holder 515. The single optical fiber patch cord 513 comprises one optical fiber 516 and one coreless fiber 517.

The coreless fiber 517 is connected to the end face 516a of the optical fiber 516 by fusion splicing to form the single optical fiber patch cord 513. The single optical fiber patch cord 513 is adhered to the inside of the ferrule 512 by adhesive, and fixed in the collimator case 511. The lens 514 is fixed in the collimator case 511 by the lens holder 515.

The fusion splicing of the coreless fiber to the optical fiber is carried out by the arc discharge or CO2 laser. When the outer diameter of the coreless fiber is largely different from the diameter of the optical fiber, the fusion splicing characteristics of the both materials are likely different. In such case, the CO2 laser can be effectively applied. The above described fusion splicing methods can be applied to the other embodiments of the invention.

The coreless fiber 517 is made of the glass rod or the silica rod having the same refractive index as that of the core 516b of the optical fiber 516. Alternatively, a low melting point glass having the same refractive index as that of the core of the optical fiber can be used as the coreless fiber 517. In this case, it is preferable that the temperature range of the tip end face 517a of the coreless fiber 517 caused by the optical power density is not over the melting point.

The outer diameter of the coreless fiber 517 is formed, based on the diameter of the beam $\phi a$ and the optical power density, in such manner that the optical power density in the tip end face 517a of the coreless fiber 517 fusion spliced to the optical fiber 516 is within a prescribed range. Thus, the outer diameter of the coreless fiber 517 is not necessarily identical to the outer diameter of the optical fiber 516. The optical power density is defined by the kinds of the optical fiber and the wavelength of the used light.

The length in the light transmission direction of the coreless fiber 517 fusion spliced to the optical fiber 516 is determined, based on the diameter of the beam $\phi a$ and the optical power density, in such manner that the optical power density in the tip end face 517a of the coreless fiber 517 fusion spliced to the optical fiber 516 is within a prescribed range. The tip end face 517a of the coreless fiber 517 fusion spliced to the optical fiber 516 is obliquely polished or cut off to be an angle within a prescribed range (for example, 8 degree) to reduce the reflection, and such antireflective coating treatment as AR coating or the like is applied thereon.

For example, the diameter of the beam $\phi a$ at the tip end face 517a of the coreless fiber 517 fusion spliced to the optical fiber 516 is controlled by the outer diameter and the length L of the optical fiber 517, so that the optical power density is set so as to proof the resistance to the heat causing such phenomenon as the fiber fuse or the like.

The lens 514 may be one of the various lens such as a spherical lens, aspheric lens, and GRIN lens.

Figure 9:
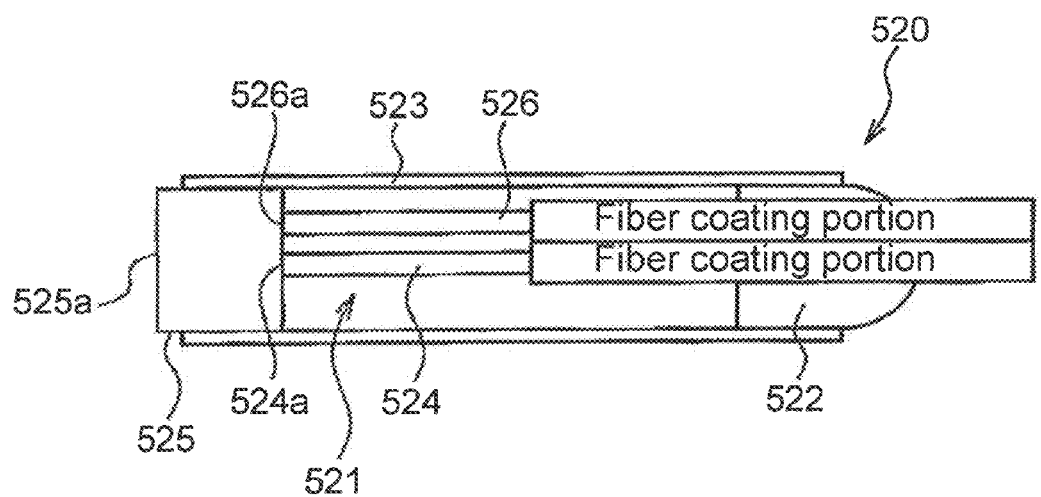
FIG. 9 is a schematic view showing an example of the two fiber ferrule such as a WDM filter module according to the invention.

FIG. 9 is a schematic view showing an example of the two fiber ferrule such as a WDM filter module of the invention. As described above, in the two fiber ferrule 520, the two optical fiber patch cord 521 is adhered to the housing 523 by the adhesive 522.

The two optical fiber patch cord 521 includes tow optical fibers 524, 526, and one coreless fiber 525. The coreless fiber 525 is fusion spliced to the end faces 524a, 526a of the respective optical fibers. The coreless fiber 525 is made of the glass rod or the silica rod having the same refractive index as that of the core of the optical fiber 524. The tip ends of the two optical fibers 524, 526 are simultaneously fusion spliced to the coreless fiber 525 to produce the two optical fiber patch cord 521.

The diameter of the coreless fiber 525 is set to be large enough to connect by fusion-splicing at least two optical fibers 524, 526 to the same interface of the coreless fiber. In addition, the diameter of the coreless fiber 517 fusion spliced to the optical fiber 516 is determined, based on the diameter of the beam and the optical power density of the two optical fibers 524, 526, in such manner that the optical power density in the tip end face 525a of the coreless fiber 525 connected by fusion-splicing to the two optical fibers 524, 526 is within a prescribed range.

The length in the light transmission direction of the coreless fiber 525 fusion spliced to the two optical fibers 524, 526 is determined, based on the diameter of the beam and the optical power density of the two optical fibers 524, 526, in such manner that the optical power density in the tip end face 525a of the coreless fiber 525 fusion spliced to the optical fibers 524, 526 is within a prescribed range.

The tip end face 525a of the coreless fiber 525 fusion spliced to the two optical fibers 524, 526 is obliquely polished or cut off to be an angle within a prescribed range (for example, 8 degree) to reduce the reflection, and such antireflective coating treatment as AR coating or the like is applied thereon.

Figure 10:
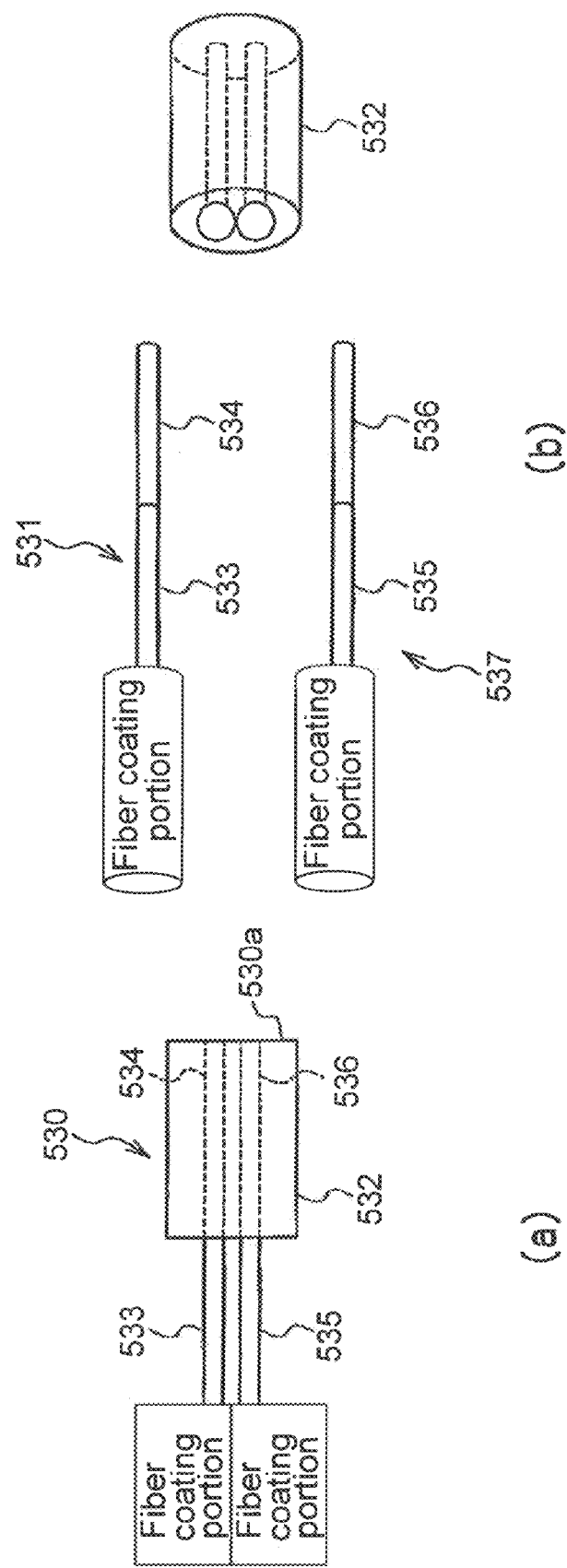
FIG. 10 is a view showing an example of the two optical fiber patch cord, FIG. 10-A is a schematic cross sectional view of the two optical fiber patch cord, and FIG. 10-B is a view showing components of the two optical fiber patch cord.

Then, other embodiment of the two optical fiber patch cord 521 in the two fiber ferrule 520 described with reference to FIG. 9 is described. FIG. 10 is a view showing an example of the two optical fiber patch cord, where FIG. 10-A is a schematic cross sectional view of the two optical fiber patch cord, and FIG. 10-B is a view showing components of the two optical fiber patch cord.

As depicted in FIG. 10, two optical fiber patch cord 530 comprises two single optical fiber patch cords 531, 537 and capillary 532. The capillary 532 is made of the silica glass or glass material having the same refractive index as that of the coreless fiber. The single optical fiber patch cord 531 comprises one optical fiber 533 and one coreless fiber 534, as described with reference to FIG. 8.

In the same manner, the single optical fiber patch cord 537 comprises one optical fiber 535 and one coreless fiber 536. The capillary 532 comprises silica two optical fiber capillary in which two capillaries having substantially the same diameter as the outer diameters of the corresponding coreless fibers 534, 536 are formed therein to receive the coreless fiber 534, 536 portion of the two optical fiber patch cord 531, 537.

In the two optical fiber patch cord 530, two single optical fiber patch cords 531, 537 are inserted into the capillary 532, and a collapse treatment is applied thereto. The tip end face 530a of the two optical fiber patch cord 530 in which the capillary 532 and the respective coreless fibers 534,536 of the two single optical fiber patch cords 531, 537 are fixed by adhesive is obliquely polished or cut off to be an angle within a prescribed range (for example, 8 degree) to reduce the reflection, and such antireflective coating treatment as AR coating or the like is applied thereon.

In order to fix the coreless fibers 534, 536 of the optical fiber patch cord and the capillary, an organic or inorganic adhesive transparent to the wavelength to be used and having substantially the same refractive index of that of the coreless fibers 534, 536 is applied. Alternatively, a melting method may be used to fix them, instead of applying the adhesive.

As the above described optical fiber, a hollow core fiber such as PCF (Photonic Crystal Fiber) and ACF (Air-Clad Fiber) may be applied.

Figure 11:
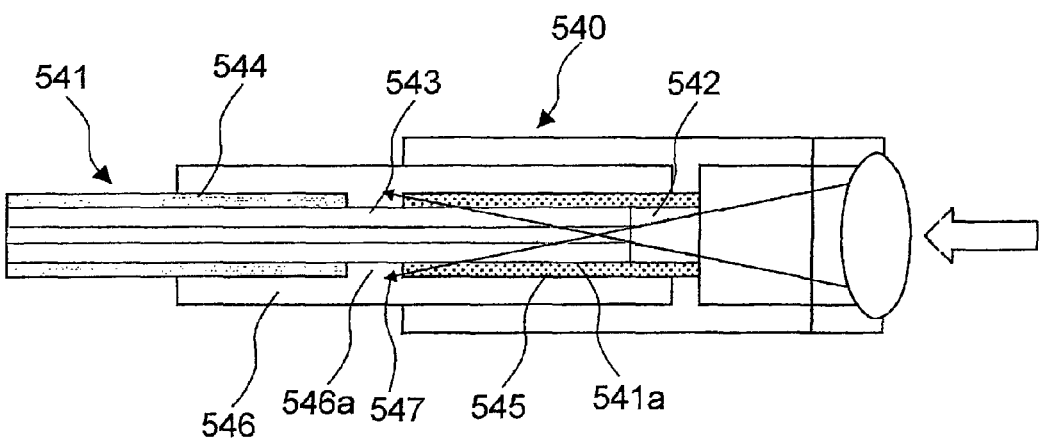
FIG. 11 is a schematic cross sectional view showing the construction of the optical collimator as the beam converting apparatus of other embodiment.
Figure 12:
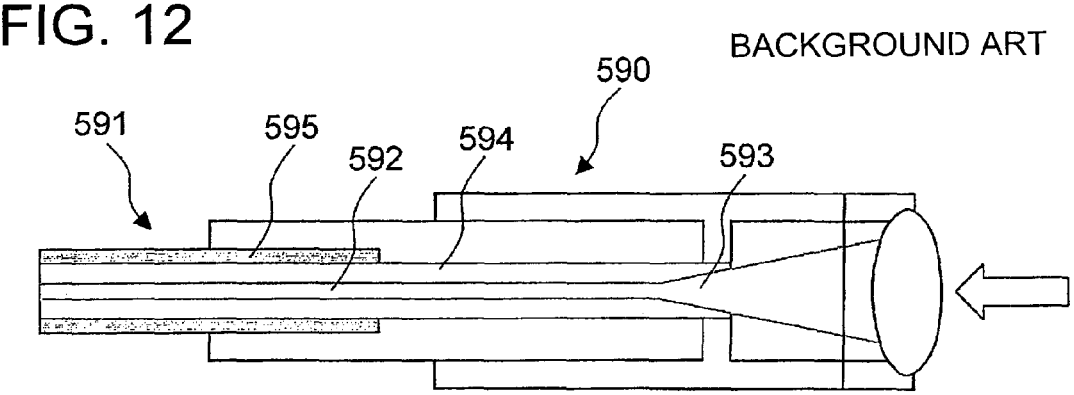
FIG. 12 is a schematic cross sectional view of the conventional optical collimator in which the tip end portion of the core in the optical fiber is enlarged by TEC treatment.
Figure 13:
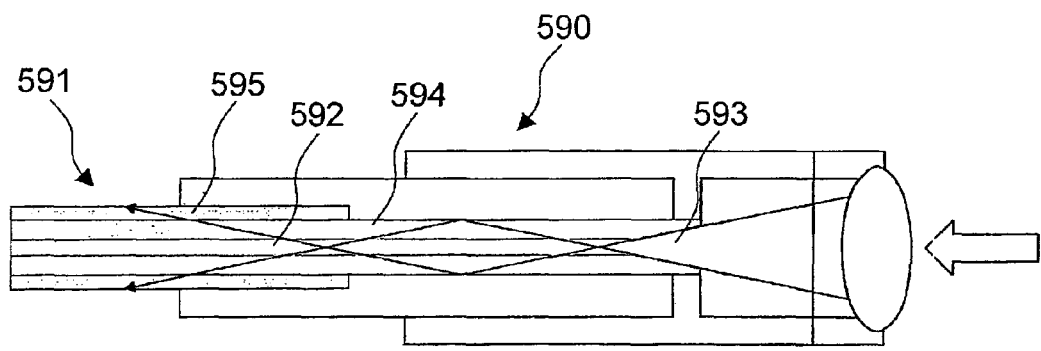
FIG. 13 is a schematic view describing how the cladding mode light damage the optical fiber.

Another embodiment of the beam converting apparatus of the invention is described with reference to FIG. 11. FIG. 11 is a schematic cross sectional view showing the construction of the optical collimator 540 as the beam converting apparatus of this embodiment. The optical collimator 540 includes a ferrule having a shielding portion 546a. The capillary 545 is fixed to integrally cover the tip end peripheral portion 541a and the peripheral portion of the coreless fiber 542 connected to the tip end face of the optical fiber by fusion splicing.

The capillary 546 has substantially identical refractive index to that of the cladding 543 of the optical fiber 541. The capillary is heat-treated so as to be attached firmly to the tip end peripheral portion 541a of the optical fiber 541 and the peripheral portion of the coreless fiber 542. The refractive index of the capillary 545 and the cladding 543 is set to be from 1.45 to 1.46, for example. The cladding mode light leaked in the cladding 543 is transmitted to the capillary 545 without reflected from the interface of the capillary 545.

The cladding mode light transmitted to the capillary 545 irradiates the ferrule 546. The light is converted therein to the heat and dissipated outside. Preferably, in order to effectively dissipate the heat through the ferrule 546, the capillary 545 is firmly adhered to the inner face of the ferrule 546.

Thus, since the capillary 545 is heat-treated so as to be integrally attached firmly to the tip end peripheral portion 541a of the optical fiber 541 and the peripheral portion of the coreless fiber 542, the cladding mode light leaked in the cladding 543 can be effectively dissipated outside, so as to prevent the optical fiber from being damaged. Although the heat treatment is preferable to firmly adhere the capillary 545 to the tip end peripheral portion 541a of the optical fiber 541, however, it is not limited to the heat treatment. A prescribed adhesive can be applied to fix them.

In the optical collimator 540 of this embodiment, the ferrule is preferably provided with the shielding portion 546a to avoid that the cladding mode light transmitted to the capillary 546a irradiates the fiber coating portion 544. The shielding portion 546a thus provided prevents the light transmitted to the capillary from irradiating the fiber coating portion 544. More specifically, the leaked light 547 reaching at the end portion of the capillary 545 is reflected from the shielding portion 546a and transmitted again in the capillary and dissipated in the ferrule 546.

As described above, in the optical collimator of this embodiment, the coreless fiber is provided to reduce the optical power density at input/output end of the optical fiber. The heat treatment is applied to firmly adhere the capillary 545 to the cladding 543 and the coreless fiber 542 so that the cladding mode light can be effectively dissipated through the capillary 545 and the ferrule 546. Thus, even if the light having high optical power density is incident or exited, the optical fiber can be surely prevented from being damaged.

Furthermore, since the ferrule 546 is provided the shielding portion 546a, the cladding mode light transmitted to the capillary 545 can be prevented from irradiating the fiber coating portion 543 so as to avoid the damage of the fiber coating portion 543.

What is claimed is:

1. A light input/output terminal module of an optical component comprising:
    a waveguide having a core and a cladding to cover an outer peripheral of the core;
    a flange having a shielding portion on a part of an inner face thereof, a first through hole being formed in the shielding portion into which the waveguide is inserted with one end thereof being fixed to a fiber coating portion to cover the waveguide; and
    a jacket tube having optical transparency and including a second through hole formed in a center thereof into which the waveguide is inserted with one end of the jacket tube being fixed to an other end of the flange and an opposite end of the jacket tube extending beyond the other end of the flange in a horizontal direction relative to the waveguide,
    wherein
        the diameter of the first through hole is smaller than both the diameters of the jacket tube and the fiber coating portion.

2. The light input/output terminal module as claimed in claim 1, wherein the jacket tube is heat treated to be integrally fusion-bonded with the cladding.

3. The light input/output terminal module as claimed in claim 1, wherein the jacket tube is fixed by adhesive to the cladding so as to have an identical refractive index as each other.

4. A light input/output terminal module of an optical component comprising:
    a waveguide having a core and a cladding to cover an outer peripheral of the core;
    a flange having a shielding portion on a part of an inner face thereof, a first through hole being formed in the shielding portion into which the waveguide is inserted with one end thereof being fixed to a fiber coating portion to cover the waveguide; and
    a jacket tube having optical transparency and including a second through hole formed in a center thereof into which the waveguide is inserted with one end thereof being fixed to an other end of the flange,
    wherein
        the jacket tube is fixed by adhesive to the cladding so as to have an identical refractive index as each other, and
        the waveguide and the jacket tube are adhered by a UV hardening adhesive having a same refractive index as that of the cladding of the waveguide.

5. A light input/output terminal module of an optical component comprising:
    a waveguide having a core and a cladding to cover an outer peripheral of the core;
    a flange having a shielding portion on a part of an inner face thereof, a first through hole being formed in the shielding portion into which the waveguide is inserted with one end thereof being fixed to a fiber coating portion to cover the waveguide; and
    a jacket tube having optical transparency and including a second through hole formed in a center thereof into which the waveguide is inserted with one end thereof being fixed to an other end of the flange,
    wherein
        the jacket tube is fixed by adhesive to the cladding so as to have an identical refractive index as each other, and
        the waveguide and the jacket tube are adhered by a substance having siloxane bond irradiated with any of an ultraviolet radiation, excimer laser, and excimer lamp.

6. The light input/output terminal module as claimed in any one of claims 1 to 2, wherein the jacket tube has about a same as or larger refractive index than that of the cladding.

7. The light input/output terminal module as claimed in any one of claims 1 to 3, wherein the refractive index of the jacket tube is selected to achieve at least prescribed value of a rate of removing a leaked light from the cladding to the jacket tube.

8. The light input/output terminal module as claimed in claim 7, wherein the jacket tube is made of a silica glass.

9. The light input/output terminal module as claimed in claim 7, wherein the jacket tube is made of a same material as the cladding.

10. A light input/output terminal module of an optical component comprising:
- a waveguide having a core and a cladding to cover an outer peripheral of the core;
- a flange having a shielding portion on a part of an inner face thereof, a first through hole being formed in the shielding portion into which the waveguide is inserted with one end thereof being fixed to a fiber coating portion to cover the waveguide; and
- a jacket tube having optical transparency and including a second through hole formed in a center thereof into which the waveguide is inserted with one end thereof being fixed to an other end of the flange, wherein
- the refractive index of the jacket tube is selected to achieve at least a prescribed value of a rate of removing a leaked light from the cladding to the jacket tube, and
- a connecting portion of the flange to the jacket tube, and a connecting portion of the flange to the fiber coating portion are fixed by a heat resistant inorganic adhesive or an epoxy adhesive.

11. The light input/output terminal module as claimed in claim 7, wherein a diameter and a length of the jacket tube maintain the rate of removal of light leaked from the cladding to the jacket tube at a prescribed value.

12. A light input/output terminal module of an optical component comprising:
- a waveguide having a core and a cladding to cover an outer peripheral of the core;
- a flange having a shielding portion on a part of an inner face thereof, a first through hole being formed in the shielding portion into which the waveguide is inserted with one end thereof being fixed to a fiber coating portion to cover the waveguide; and
- a jacket tube having optical transparency and including a second through hole formed in a center thereof into which the waveguide is inserted with one end of the jacket tube being fixed to an other end of the flange and an opposite end of the jacket tube extending beyond the other end of the flange in a horizontal direction relative to the waveguide, wherein
- the refractive index of the jacket tube is selected to achieve at least a prescribed value of a rate of removing a leaked light from the cladding to the jacket tube, and
- the flange is made of a stainless-based metal material.

13. The light input/output terminal module as claimed in claim 1, wherein there is a gap between the shielding portion and the end of the jacket tube facing the shielding portion.

* * * * *